UNITED STATES PATENT OFFICE.

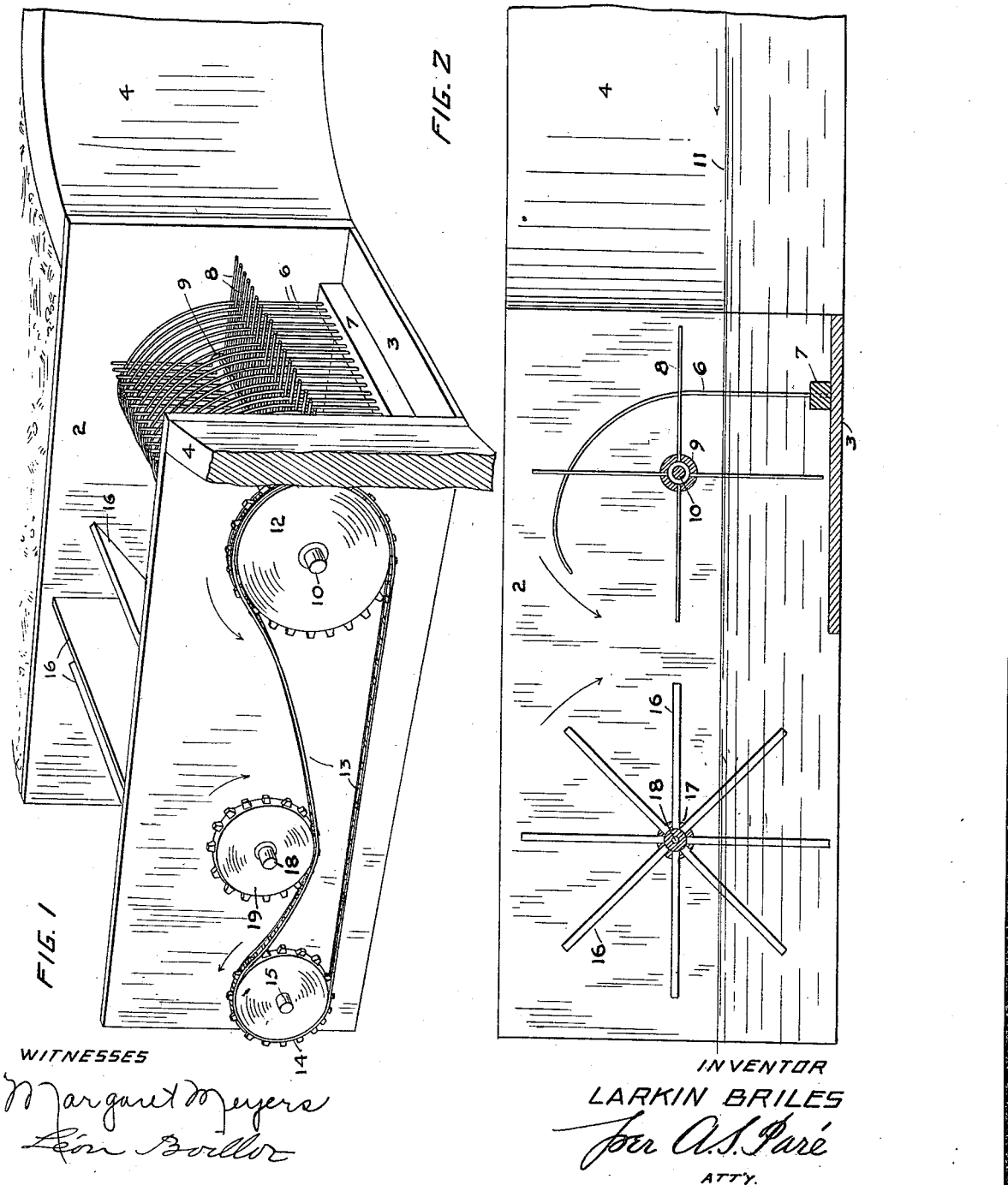
L. BRILES.
AUTOMATIC CLEANER FOR FISH SCREENS.
APPLICATION FILED AUG. 4, 1914.
1,143,496. Patented June 15, 1915.
WITNESSES
Margaret Meyers
INVENTOR
LARKIN BRILES
per A. S. Paré
ATTY.

LARKIN BRILES, OF LAKE CITY, CALIFORNIA.

AUTOMATIC CLEANER FOR FISH-SCREENS.

1,143,496.  Specification of Letters Patent.  Patented June 15, 1915.

Application filed August 4, 1914.  Serial No. 854,962.

*To all whom it may concern:*

Be it known that I, LARKIN BRILES, citizen of the United States, residing at Lake City, county of Modoc, State of California, have invented certain new and useful Improvements in Automatic Cleaners for Fish-Screens, whereof the following is a specification.

This invention relates to improvements in fish screen guards, and more particularly to means for keeping the same said guards free of debris, liable to accumulate therein.

In irrigation districts considerable fish life is lost, by the fish passing from the main canals of supply into the smaller laterals, that leave the fish stranded when the water is absorbed by the soil. This condition calls for screens across the mouths of the laterals where they join the main canal. In many districts these screens are demanded by game laws for the protection of the fish. The principal difficulty encountered in placing these screens, is the accumulation of debris, such as leaves, twigs, and other floatsam that lodges in the screens, preventing the passage of water into the laterals.

The primary object of this invention, is to provide means for automatically and constantly preventing the lodgment of obstructive matter against the screens.

Another object is to utilize the force of the flowing water, to operate the debris dislodging mechanism.

Other objects and advantages will appear as the description progresses.

In the one sheet of drawing accompanying and forming part of the present specification to which like reference characters have been applied one desirable means of putting this invention into practice is disclosed. In the drawings; Figure 1 is a perspective view of a fish screen or guard, constructed in accordance with this invention and installed in the mouth of a lateral ditch and Fig. 2 is a side elevation in longitudinal cross section, of the same.

The construction illustrated in the drawings includes, the side walls 1 and 2, joined by the flooring 3 to form an open sluice box-like structure, and a flaring mouth, 4, connected to the main ditch. And the floor 3 prevents washing away under the guard.

The guard consists of the upright tines 6, having their lower ends embedded in the cross bar 7 attached to the floor 3, and extend upward and curve rearward, to form an overhanging arch and must be sufficiently close, to prevent the entrance of small fish, with the inflowing stream of water. To prevent the accumulation of floating obstructive matter against the tines 6, a stripper is provided, comprising the spokes 8 set in the hub 9, fixed on the shaft 10, journaled in suitable bearings in the walls 1 and 2, above the water line 11. These spokes 8 are spaced apart and passed between the tines 6 when rotated. The shaft 10 is rotated by a sprocket gear 12, fixed on the protruding end of the shaft 10, engaging the end of the sprocket chain 13, running over the idler 14, mounted on the stud 15, fixed on the outside of the wall 1.

The motive power consists of a paddle wheel, comprising the paddles 16 fixed in the hub 17, mounted upon the shaft 18, suitably journaled in the walls 1 and 2. This paddle wheel is driven by the flow of water between the walls 1 and 2. It is preferable to have the stripper rotate in the opposite direction to the paddle wheel, so as to engage any accumulated obstruction at the bottom of the guard, and sweep it upward over the inturned ends, from whence it is discharged into the water flowing through the sluice formed by the guard structure. To accomplish this reversal of the direction of motion, the drive sprocket 19 fixed on the protruding end of the shaft 18, engages the upper side of the sprocket chain 13; necessitating the use of the idler 14, that may be made adjustable to take up the slack in the sprocket chain 13. The sprocket and chain form of drive is preferred, because of its simplicity, ease of installation, and economy in operation. It is obvious, however, that spur gearing may be substituted, or a reversed belt used to accomplish the desired transmission of power.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Let- ters Patent of the United States is the following, to wit:

A fish guard, comprising a sluiceway, a screen closing the mouth of said sluiceway, said screen composed of upright tines having straight portions at their lower ends and backwardly curved portions at their upper ends, a rotating rake mounted eccentrically of said curved portion of said screen and in proximity to the straight portion thereof, and having prongs of such length and so positioned that they project between the tines of the screen under debris lodged thereagainst and pass from between said tines before reaching the ends thereof, whereby such debris is raised and thrown over the screen and the prongs of the rake stripped thereby, and a paddle wheel adapted to be rotated by the current flowing into said sluiceway, and gearing connecting said paddle wheel and said rake, and adapted to rotate the rake oppositely to the paddle wheel.

In testimony that I claim the foregoing I have hereto set my hand in the presence of two witnesses, this 18th day of July, 1914.

LARKIN BRILES.

Witnesses:
E. G. HARTLERODE,
THOS. BRILES.

Copies of this patent may be obtained for five cents each, by addressing the "Commissioner of Patents, Washington, D. C."